United States Patent [19]
Maguire et al.

[11] Patent Number: 6,095,946
[45] Date of Patent: Aug. 1, 2000

[54] TEMPERATURE RISE CONTROL FOR DISC TYPE FRICTION TORQUE TRANSMITTERS

[75] Inventors: Joel Michael Maguire, Northville; Paul Dwight Stevenson, Ann Arbor, both of Mich.

[73] Assignee: General Motors Corporation, Detroit, Mich.

[21] Appl. No.: 09/289,921

[22] Filed: Apr. 12, 1999

[51] Int. Cl.[7] .................................................. B60K 23/02
[52] U.S. Cl. .............................................. 477/98; 477/76
[58] Field of Search .................................. 477/97, 98, 72, 477/76; 701/55, 56, 65, 103, 104, 105

[56] References Cited

U.S. PATENT DOCUMENTS

| | | | |
|---|---|---|---|
| 3,851,723 | 12/1974 | Pagdin | 477/98 X |
| 4,733,581 | 3/1988 | Hasegawa et al. | 477/98 |
| 4,807,495 | 2/1989 | Wallace | 477/98 |
| 4,815,340 | 3/1989 | Iwatsuki et al. | 477/98 |
| 5,029,492 | 7/1991 | Kiuchi | 477/98 |
| 5,337,630 | 8/1994 | Sakai et al. | 701/65 X |
| 5,556,349 | 9/1996 | Ishii et al. | 477/97 X |
| 5,601,511 | 2/1997 | Michioka | 477/98 |
| 5,681,237 | 10/1997 | Furukawa et al. | 477/98 |
| 5,707,315 | 1/1998 | Furukawa et al. | 477/98 |
| 5,713,815 | 2/1998 | Funatsu et al. | 477/98 X |
| 5,823,912 | 10/1998 | Fischer et al. | 477/98 X |
| 5,857,162 | 1/1999 | Vukovich et al. | 477/98 X |
| 5,960,669 | 10/1999 | Ohashi et al. | 477/98 X |

*Primary Examiner*—Khoi Q. Ta
*Attorney, Agent, or Firm*—Dean L. Ellis; Michael J. Bridges

[57] ABSTRACT

A multi-speed transmission control has a CPU which utilizes a pre-programmed computer to control the interchange of the friction devices in the transmission. A routine within the CPU is executed by the computer at least when an impending ratio interchange is sensed. The routine uses stored data which includes friction disc parameters, engine operating parameters and vehicle performance parameters to determine if the impending shift will result in sufficient excess heat energy to cause the temperature of components in the friction device to exceed a predetermined design limit. If the temperature design limit will be exceeded, a reduced energy ratio interchange is commanded utilizing adaptive parameters for the upcoming shift; and if the temperature design limit will not be exceeded, the ratio interchange proceeds without adaptive parameters.

5 Claims, 2 Drawing Sheets

TEMPERATURE RISE CONTROL FOR DISC TYPE FRICTION TORQUE TRANSMITTERS

TECHNICAL FIELD

This invention relates to fluid operated friction torque transmitting mechanism and more particularly to disc type clutches and brakes.

BACKGROUND OF THE INVENTION

Automatic transmissions have a plurality of fluid operated friction devices, clutches and brakes, that control the drive ratio between the transmission input and the transmission output. Many of these friction devices are piston operated type mechanisms which include a disc pack having members (discs or plates) alternately connected between an input structure (a shaft, hub or gear) and an output structure (a shaft, hub or gear). In most instances, one set of discs has a friction material at the interface and another set of discs has a metal surface at the interface. The friction device is engaged to establish a drive ratio ($1^{st}$ gear, $2^{nd}$ gear, etc.) between the transmission input and output.

The engagement of one friction device and the simultaneous disengagement of another device is generally termed a ratio interchange or shift. This interchange may be an upshift, increasing speed ratio or a downshift, decreasing speed ratio, and is often made under power transfer conditions during vehicle acceleration such that a large amount of heat energy is created in the friction device.

Current power transmissions disperse the heat energy with a large heat sink, generally a metal housing and metal discs, fluid cooling and a large number of friction discs or a large disc interface surface area. The friction device is sized to accommodate a number of successive high energy shifts which can occur during extended hill climbing or under abusive driving conditions. Under these design criteria, the friction device is significantly larger, either axially or radially or both, than is required for any one high energy shift since the powertrain must be protected from the cumulative temperature rise resulting from a series of high energy shifts. The energy transfer protection factor thus built into the powertrain serves to increase the size, weight and cost of the transmission, particularly when the system can employ at least two rotating clutches and two stationary clutches or brakes.

SUMMARY OF THE INVENTION

It is an object of the present invention to provide an improved transmission control which will permit the reduction in size of the disc type friction devices used in power shifting automatic transmissions.

In one aspect of the present invention, the control employs a method of determining the required energy for an upcoming shift. In another aspect of the present invention, the control has information regarding the vehicle and operating parameters to assist in determining the energy to be transferred.

In yet another aspect of the present invention, the temperature rise which will result from the energy transfer is considered in determining the amount of heat sink required to absorb the heat energy. In still another aspect of the present invention, the amount of heat sink available and the predicted temperature rise in the heat sink is evaluated.

In a further aspect of the present invention, when the control determines that the temperature rise will result in a higher than desired temperature at the clutch, the control responds by reducing the energy input during the ratio interchange. In yet a further aspect of the present invention, the control permits a normal shift time and energy transfer when the predicted temperature rise can be accommodated by the heat sink.

The amount of energy that is dissipated in an automotive transmission shift has a direct influence on the temperature rise in the friction disc pack. Temperature rise during a ratio interchange is typically used as one of the limiting factors for the size and number of friction discs or plates (torque capacity also needs to be considered).

With the present invention, the heat energy generated during a ratio interchange is modified by controlling the amount of time required to complete the shift. Increasing clutch torque capacity results in shorter shift time and less energy dissipated. There is a temperature limit for clutch plates above which the clutch facing can be overheated and the life of the clutch is shortened. The present invention, by maintaining the clutch friction face below this temperature threshold, will reduce the likelihood of reducing the life of the clutch below the design limit.

Since temperature rise is a function of the shift energy and energy is a function of shift time, the temperature of the clutch can be held below the predetermined design temperature limit by making the shift in a short enough time. The short shift will produce a "firm" shift feel such that this change in shift feel will be noticed by the operator only when the vehicle is being driven under conditions during which repeated demanding or abusive maneuvers are performed. The present invention permits the standard or normal shift interchange to resume once it has been determined that the clutch pack has cooled sufficiently.

DESCRIPTION OF AN EXEMPLARY EMBODIMENT

Figure 1:
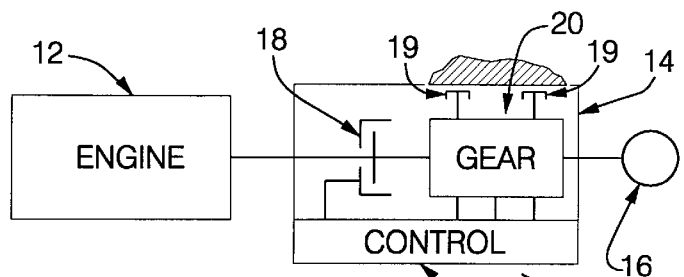
FIG. 1 is a diagrammatic representation of a powertrain in which the present invention is usable.

A powertrain 10, shown in FIG. 1, is comprised of an engine 12, a transmission 14, and an output differential 16. The transmission 14 is comprised of a conventional, selectively-engageable friction torque transmitting mechanism or clutch 18, a conventional planetary gear arrangement, represented by box 20, and an electro-hydraulic control 22. The transmission may be constructed in accordance with one or more of the following United States Patents describing multi-speed transmissions: U.S. Pat. No. 4,223,569 issued to Koivunen et al on Sep. 23, 1980; U.S. Pat. No. 4,237,749 issued to Koivunen on Dec. 9, 1980; U.S. Pat. No. 4,418,587 issued to Borman on Apr. 3, 1983; or U.S. Pat. No. 4,086,827 issued to Chana on May 2, 1978. There are, of course, many other multi-speed transmissions which can benefit from the present invention. The planetary gear arrangement 20 includes a plurality of conventional planetary gear sets and friction torque transmitting mechanisms, including clutch 18, for controlling the gear ratio or drive ratio between the engine 12 and the differential 16.

The friction torque transmitting mechanisms are conventional devices having a fluid operated piston which is axially moveable to enforce engagement of two sets of a plurality of friction discs or plates which are connected between two members of the transmission 14. One set of the discs are steel plates and the other set of discs is comprised of a friction material bonded to a metal plate. The friction discs may be components in clutches, connected between two rotating members of the planetary gear sets such as clutch 18, or brakes 19 (stationary clutches or bands), connected between a rotating member and a transmission housing.

In either structure, the friction devices will transmit energy which will result in the friction discs increasing in temperature during engagement (relative slippage between adjacent discs) and the structures are cooled by fluid flow when completely engaged or disengaged. The steel discs provide a heat sink for absorbing the heat energy which occurs during the slipping portion of the engagement cycle of the friction device. The heat absorbed by the steel discs is transferred to the hydraulic fluid and surrounding metal components.

Figure 4:
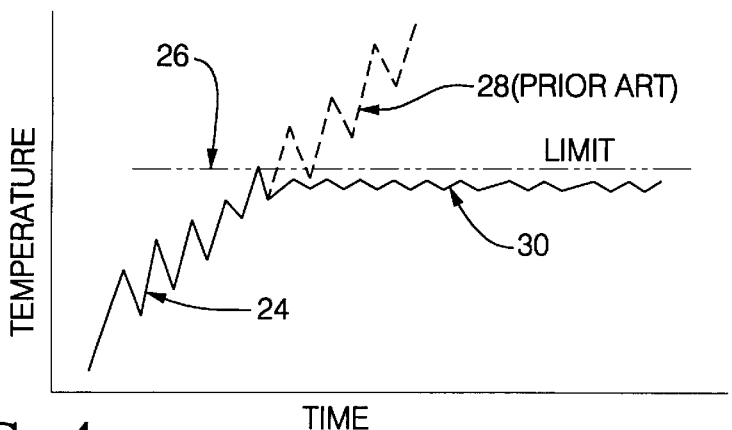
FIG. 4 is a curve of the temperature rise in a friction device during repeated high energy shifts.

The transfer of heat energy to the hydraulic fluid and surrounding component of the friction device is not instantaneous and requires some time for dissipation. Therefore, with repeated high energy shifts, the temperature of the friction discs will increase along line 24 as seen in FIG. 4 until a design temperature limit is reached at line 26. In the prior art friction devices, the temperature can continue to rise above the design limit along line 28 resulting in overheating of the friction discs which can lead to a shorter useful life for the friction device.

As a result, the prior art friction devices have a higher design limit to accommodate the possibility of overheating. Since the overheating may occur in only a small percentage of the population, the transmissions generally have a larger heat sink, more friction disc surface area or thicker steel plates, than necessary to protect the general population. The present invention will maintain the temperature of the friction device along line 30 below the design limit line 26. This will prevent the clutch from overheating while also permitting a lower design temperature limit and a smaller packaging requirement.

The electro-hydraulic control 22 includes a conventional central processing unit (CPU), not shown, which includes a preprogrammed digital computer. The CPU, with the computer, controls the operation of the transmission and the engine. A number of input signals provide data for the CPU which are processed by the computer and the CPU is given output data from the computer. Some of the input signals include engine throttle setting, engine speed, vehicle speed, vehicle acceleration, and oil temperature of the transmission fluid, to name a few.

The CPU uses the output data to control various devices such a solenoid valves, engine spark and engine fuel feed. Some of the solenoid valves control the engagement and disengagement of the friction mechanisms including the clutch 18. Thus, the CPU controls the engine output energy, the engagement time of the friction devices, the rate of pressure change in the friction devices during engagement and the maximum engagement pressure in the friction devices.

Figure 2:
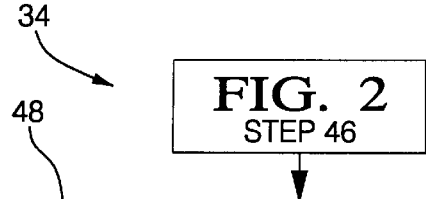
FIG. 2 is a diagrammatic representation of an algorithm incorporating in the present invention.

Algorithm 32, shown in FIG. 2, is executed by a computer during the design of a clutch for use in a conventional powertrain. At step 36, the algorithm 32 has stored or input data concerning various operating parameters of the engine and transmission. The data includes the engine torque curve, clutch design criteria, engine speed, transmission ratio, vehicle speed, throttle setting transmission and sump temperature, to name a few. By placing sensors at each of the friction devices, the present temperature of each device can be stored at step 36. In the alternative, an algorithm which will calculate the temperature can be employed, thereby eliminating the need for temperature sensors. If a shift is requested, the algorithm reads data into step 38 and adds some information such as the ratio to be engaged, the time required for a conventional shift, and the torque capacity of the friction device to be engaged.

Figure 3:
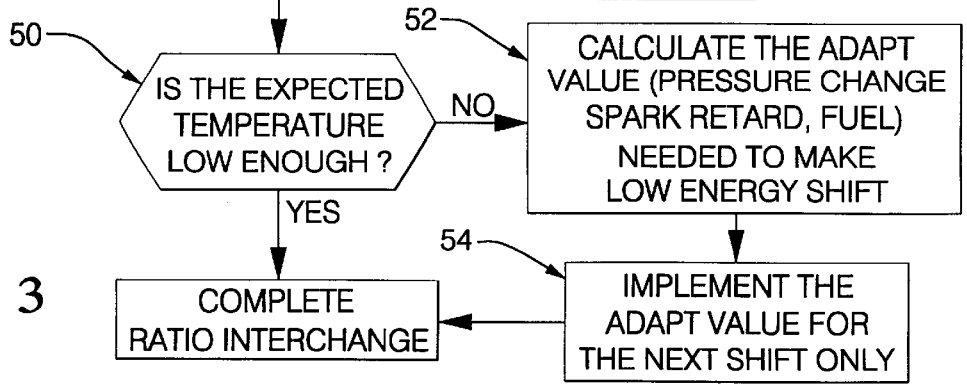
FIG. 3 is a diagrammatic representation of an algorithm of a sub-routine under FIG. 2 incorporating the present invention.
Figure 2:
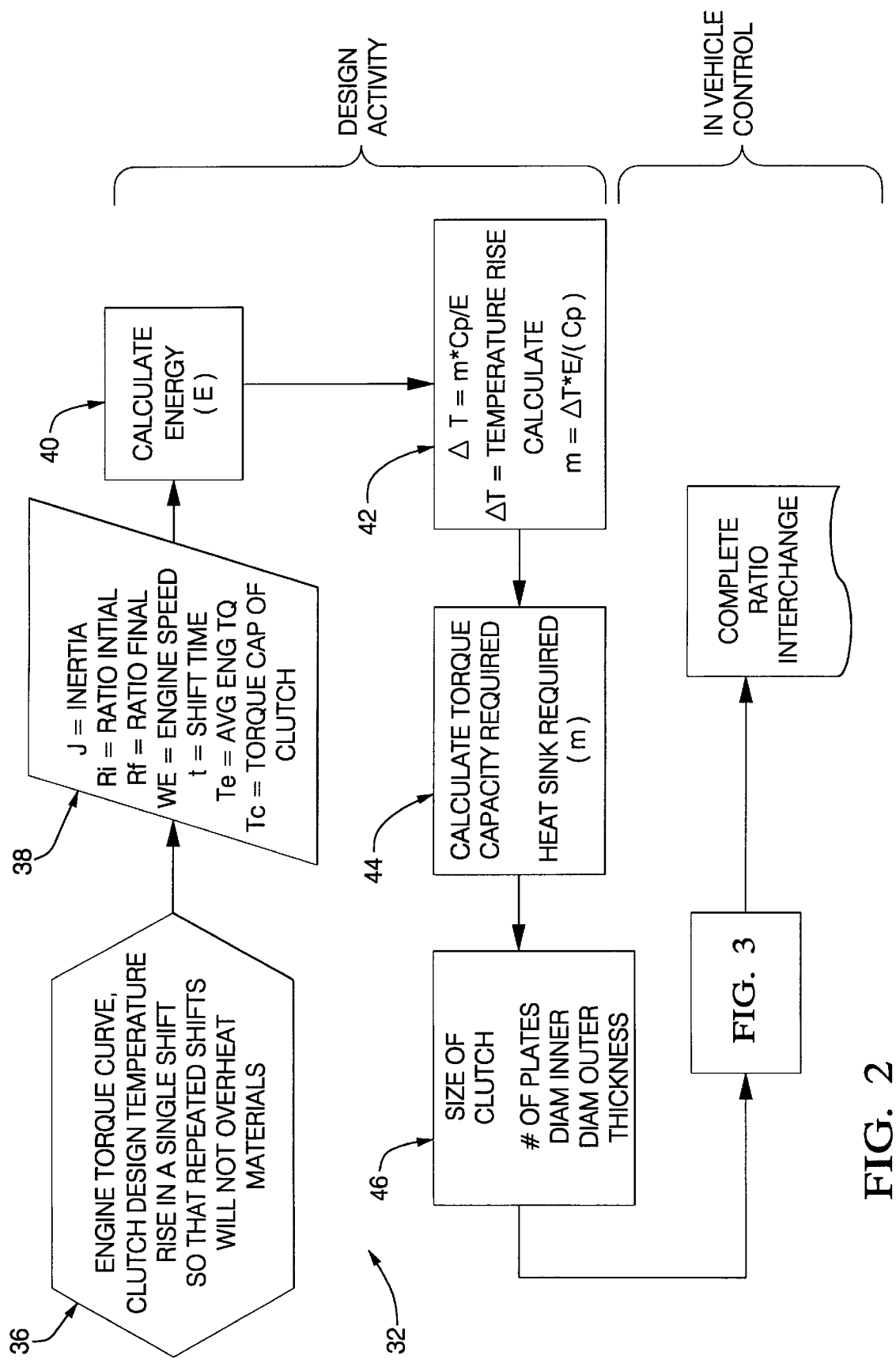

The computer uses the data in step 38 to calculate the energy that will be transmitted during the shift in step 40 and passes the calculation to step 42 where the temperature differential expected during the shift is calculated or predicted and the required heat sink is determined. At step 44, the algorithm determines the torque capacity required to complete the ratio interchange and the heat sink required to absorb the heat that will be generated during the ratio interchange. This information is combined with friction design information at step 46 and is stored or otherwise provided to the algorithm 34 at step 48, shown in FIG. 3.

The algorithm 34, at step 48, reads stored information to determine the transmission sump temperature, the time since the last ratio interchange, and the temperature rise since the last ratio interchange. The step 48 also calculates the temperature of the friction device, the expected temperature rise due to the impending shift, and the expected temperature of the friction device at the end of the shift.

At step 50, the algorithm determines if the expected temperature at the end of the shift will be less than the design limit at line 26 in FIG. 4. If the temperature will be below the design limit, the algorithm passes control to the main program to execute the shift. If the temperature will exceed the design limit, the algorithm performs step 52 which determines the adaptive values for shift time, engine spark timing and fuel feed that should be established such that the energy absorbed during the ratio interchange will not result in a temperature increase above the design limit. At step 54, the adaptive values are passed to the main program to be used for this shift only.

The shift will generally be made with lower engine torque and increased apply pressure at the friction device. This will result in a fast ratio interchange which will be noticeable to the operator, who will perhaps alter the driving condition of the vehicle. For example, the operator may undertake a less rapid acceleration from a stop or a single manual downshift to reduce the number of ratio interchanges on an upgrade.

The incorporation of this invention into the conventional transmission and engine control system will reduce the size of the friction devices in the transmission. For example, the design parameters may be changed such that the device may require one or two fewer discs, or the steel discs (heat sink) may be made thinner, or the surface area of each disc in the device made be reduced, or a combination of these design parameters may be used. Each of these changes results in a reduction in space requirements and transmission weight. Both of these factors result in reduced cost of materials. The weight reduction will improve overall vehicle efficiency by contributing to increased fuel economy.

What is claimed is:

1. A control for an engine driven multi-speed transmission having a plurality of friction devices which are selectively interchanged to complete a transmission ratio shift and during which shift heat energy is transmitted through an oncoming friction device, said control comprising:

means for storing a plurality of parameters of an engine and the transmission and for determining an impending ratio interchange said transmission parameters including friction device size, a heat sink capacity of each friction device and engagement pressures for each friction device, said engine parameters including engine inertia;

means using at least said friction device size and said heat sink capacity for determining a heat energy amount which will be absorbed by the heat sink of an oncoming friction device during the impending ration interchange;

means for determining if said heat energy amount to be absorbed by the heat sink will cause a temperature in the oncoming friction device to exceed a predetermined value; and means for instructing a portion of the engine parameters to be reduced during the impending ratio interchange when the temperature in the oncoming friction device will exceed the predetermined value.

2. The control defined in claim 1 further comprising:

means for determining adaptive values for the transmission parameters and for incorporating said adaptive values into said control during the engagement of the oncoming friction device for only the impending ratio interchange.

3. A control for an engine driven multi-speed transmission having a plurality of friction devices which are selectively interchanged to complete a transmission ratio shift and during which shift heat energy is transmitted through an oncoming friction device, said control comprising:

means for storing a plurality of parameters of an engine and the transmission and for determining an impending ratio interchange said transmission parameters including friction plate diameter and thickness and a heat sink capacity for each friction device;

means for determining a heat energy amount which will be absorbed by the friction device during the impending ratio interchange;

means using at least said heat sink capacity and said friction plate diameter and thickness for determining if said heat energy amount will cause a temperature in a heat sink of the oncoming friction device to exceed a predetermined value;

means for determining adaptive values for the transmission parameters; and means for instructing a portion of the transmission parameters to utilize said adaptive values during the impending ratio interchange when it is determined that the temperature of the heat sink of the oncoming friction device will exceed the predetermined value.

4. A friction apparatus engagement control for an engine driven multi-speed transmission having a plurality of friction devices which are selectively interchanged to complete a transmission ratio shift and during which shift heat energy is transmitted through an oncoming friction device having a heat sink portion, said control comprising:

means for storing a plurality of parameters of an engine and the transmission including friction device size parameters, and a heat sink portion capacity;

means for determining an impending ratio interchange;

means for determining a first temperature of the oncoming friction device;

means for determining a heat energy amount which will be absorbed by said friction device during the impending ratio interchange;

means for determining, from at least said heat sink portion capacity and said friction device size parameters, if said heat energy amount will cause a second temperature in a heat sink of the oncoming friction device to exceed a first predetermined value;

means for determining adaptive values for a portion of the engine and transmission parameters; and means for instructing the engine and the transmission to utilize the adaptive parameters to reduce the heat energy below a second predetermined value during the impending ratio interchange to maintain the second temperature below first predetermined.

5. A method of controlling engagement of a fluid operated friction torque transmitting apparatus, said method comprising the steps of:

storing a plurality of operating and design parameters of an engine and a transmission comprising engine inertia, torque capacity of the friction torque transmitting apparatus, shift times to complete a ratio interchange, a heat sink capacity for the friction torque transmitting apparatus, and plate dimensions for the friction torque transmitting apparatus;

determining an impending ratio interchange;

determining a temperature of an oncoming friction torque transmitting apparatus;

determining a heat energy amount which will be absorbed by the friction torque transmitting apparatus during the impending ratio interchange;

using said transmission parameters of at least heat sink capacity and plate dimensions to determine if said heat energy amount will cause the temperature in oncoming friction torque transmitting apparatus to exceed a predetermined temperature value;

determining adaptive values for a portion of the engine and transmission operating parameters; and instructing the engine and the transmission to utilize the adaptive parameters to reduce the heat energy below a predetermined value during the impending ratio interchange when it is determined that the temperature of the oncoming friction torque transmitting apparatus will exceed said predetermined temperature value.

* * * * *